United States Patent [19]
Hutter et al.

[11] Patent Number: 5,836,074
[45] Date of Patent: Nov. 17, 1998

[54] APPARATUS FOR INSERTING A VALVE INTO AN ORIFICE TUBE

[75] Inventors: Robert John Hutter, Plymouth; Mike Heinonen, Brighton; Atul Natverial Sheth, Novi, all of Mich.

[73] Assignee: Ford Motor Company, Dearborn, Mich.

[21] Appl. No.: 808,774

[22] Filed: Mar. 3, 1997

[51] Int. Cl.⁶ .............................. B23P 19/04; B23P 21/00
[52] U.S. Cl. ........................ 29/714; 29/213.1; 29/252; 29/720; 269/20
[58] Field of Search .................. 210/91, 94, 136, 210/188, 232, 175; 29/213.1, 221.6, 237, 240, 709, 714, 719, 720, 281.5, 890.06, 890.7, 890.124, 252; 62/471, 503; 137/515; 116/277; 269/20, 24

[56] References Cited

U.S. PATENT DOCUMENTS

| | | | |
|---|---|---|---|
| 6,929 | 12/1849 | Du Trembley | 29/890.7 |
| 3,935,713 | 2/1976 | Olson | 29/221.6 |
| 5,086,555 | 2/1992 | Broadway et al. | 29/213.1 |
| 5,321,506 | 6/1994 | Sargent | 29/240 |

*Primary Examiner*—Joseph W. Drodge
*Attorney, Agent, or Firm*—Raymond L. Coppiellie

[57] ABSTRACT

The present invention is a tool for inserting an evaporator orifice tube check valve into an evaporator orifice tube. The tool uses a press pin comprising a pneumatically activated cylinder which forces the evaporator orifice tube check valve into the evaporator orifice tube a predetermined distance. The tool also includes a reciprocating cylinder which locates the valve to a proper seating depth, a signal generator which notifies the operator if the valve in a particular evaporator is not seated properly, and a marking device which creates a label on the evaporator orifice tube only if the evaporator orifice tube check valve is at the predetermined desired location.

1 Claim, 3 Drawing Sheets

APPARATUS FOR INSERTING A VALVE INTO AN ORIFICE TUBE

BACKGROUND OF THE INVENTION

1. Field of the Invention

The present invention relations generally to an apparatus for inserting valves into tubes. More particularly, the present invention relates to an apparatus for inserting a check valve into an orifice tube of an evaporator assembly.

2. Disclosure Information

Evaporator assemblies of the type used in the automotive industry employ orifice tubes which provide an inlet port for the introduction of the refrigerant material into the evaporator. As is well known, a check valve assembly typically is inserted into the orifice tube of the evaporator to regulate the volume of fluid entering the assembly by separating the high charge and low charge components so that only low charge refrigerant enters the evaporator. Heretofore, the check valves were manually placed in the orifice tubes as the evaporator assemblies moved along the production line in the manufacturing facility. If an operator failed to place the check valve into the orifice tube, the missing check valve would not be detected during the remaining manufacturing steps of the evaporator assembly. Consequently, the operation of the evaporator assembly might be impaired because of the missing check valve.

Therefore, it would be advantageous to provide an apparatus which detects whether an orifice tube check valve is in place and properly positions the valve within the tube.

SUMMARY OF THE INVENTION

The present invention overcomes the problems of the prior art by providing an apparatus for inserting an orifice tube check valve into an orifice tube of an evaporator assembly for an automotive vehicle. The apparatus comprises a housing including an orifice tube receiving channel, a sensor for determining when the orifice tube check valve is received in the orifice tube receiving channel and means for determining the presence of an orifice tube check valve in the orifice tube of the evaporator. The apparatus further includes a pneumatically activated cylinder which engages the orifice tube check valve and inserts it into the orifice tube a predetermined distance. The apparatus also includes a limit switch disposed on the housing for limiting the travel of said pneumatically activated cylinder into said orifice tube, a pressure responsive switch for measuring the amount of pressure applied against the pneumatically activated cylinder and a marker disposed in said orifice tube channel for marking the orifice tube only if the orifice tube check valve is at the predetermined location. The apparatus further includes a holding member disposed on the housing for releasably engaging the orifice tube when the orifice tube is seated in said orifice tube channel and a signal generating device for signaling an operator when an orifice tube check valve is improperly located within said orifice tube.

It is an advantage of the present invention to ensure that an orifice tube check valve is properly inserted in an orifice tube to minimize the possibility of operator error during the manufacturing process.

It is a further advantage of the present invention to reduce labor and warrant costs associated with the assembly of an evaporator assembly.

DETAILED DESCRIPTION OF THE PREFERRED EMBODIMENTS

Figure 1:
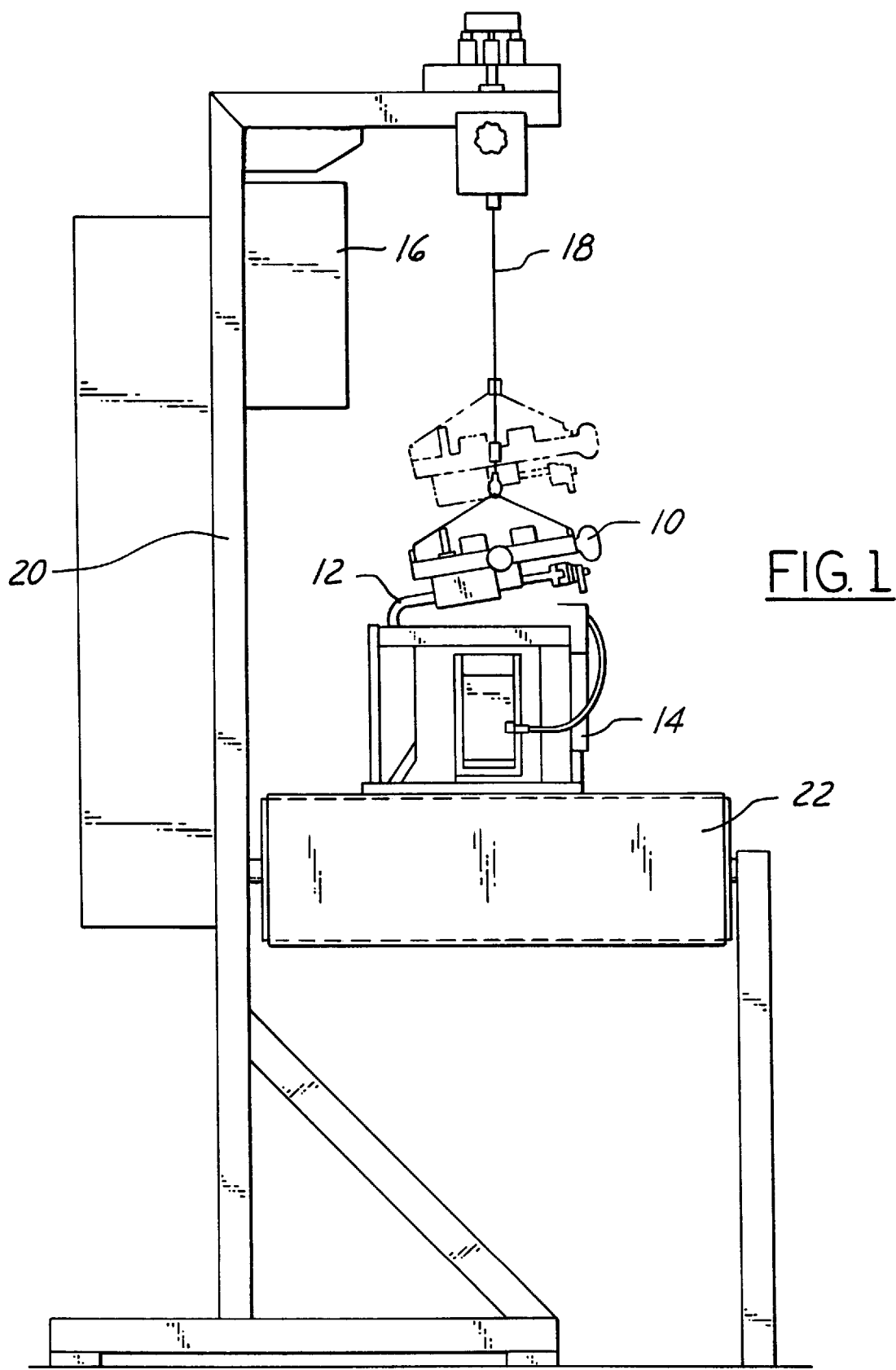
FIG. 1 is a perspective view of an evaporator assembly on a conveyor in a manufacturing facility.
Figure 2:
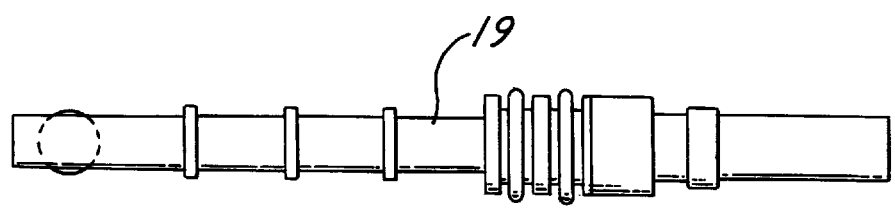
FIG. 2 is an elevational view of an orifice tube check valve used in the present invention.

Referring now to the drawings, FIG. 1 shows an apparatus or tool 10 for inserting an orifice tube check valve into an orifice tube 12 of an evaporator assembly 14. The tool 10 is electrically connected to a processor 16 by a wire 18. The processor 16 is secured to a work station 20 in a manufacturing facility. The evaporator 14 is carried from one work station to the present station 20 by means of a conveyor assembly 22 as is known in the manufacturing art. As shown in FIG. 1, the tool 10 is positionable from one position to another by wire 18. This allows for the convenience of the work station operator during the manufacturing process. As is commonly known in the heat exchanger art, an orifice tube check valve (19 in FIG. 2) allows only low charge refrigerant to enter the evaporator.

Figure 3A:
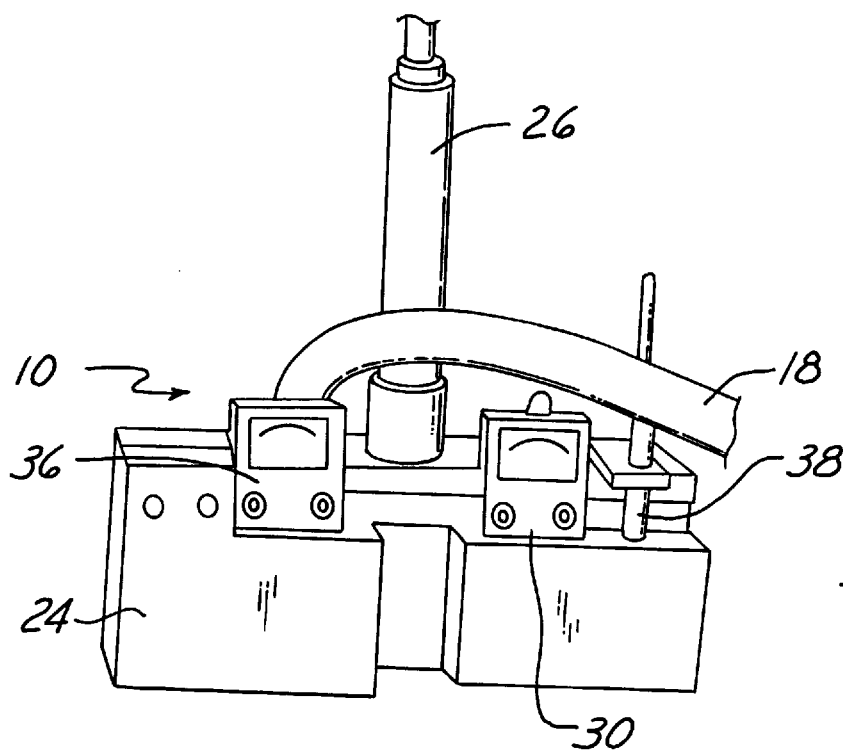
FIGS. 3A and 3B are front and bottom elevational views, respectively, of an apparatus structured in accord with the principles of the present invention.
Figure 3B:
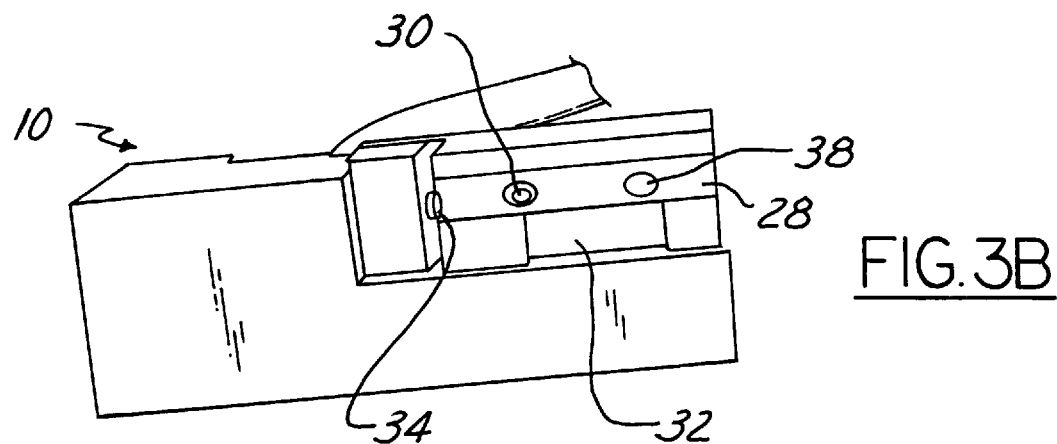
Figure 4:
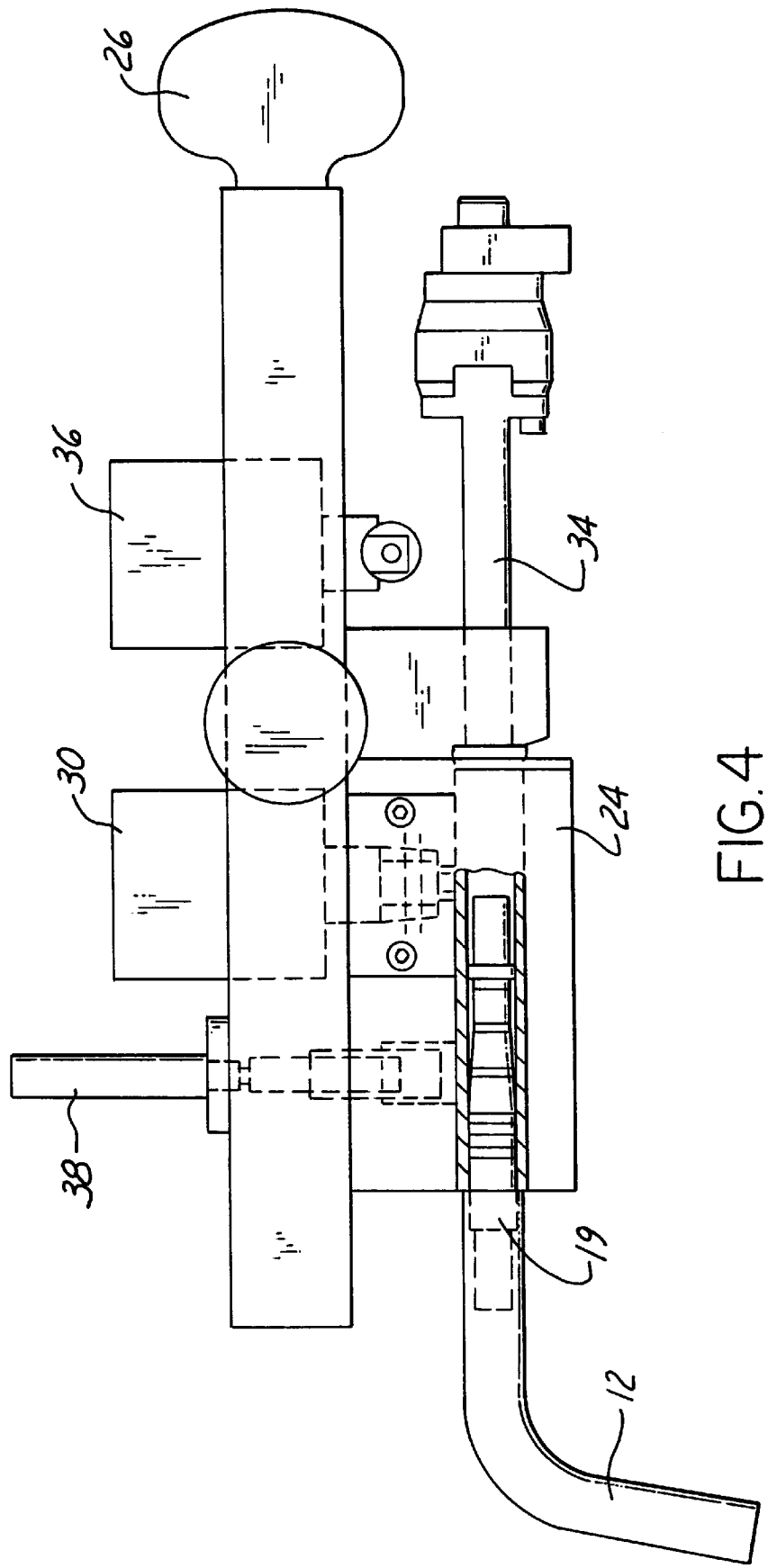
FIG. 4 is a cross-sectional view of an apparatus structured in accord with the principles of the present invention.

As shown more clearly in FIGS. 3A, 3B and 4, the tool 10 of the present invention comprises a housing 24 having a handle 26 thereon. The work station operator moves the tool 10 during use by handle 26. The housing includes a channel 28 disposed on the bottom side thereof. The channel 28 is configured to receive the orifice tube of the evaporator assembly during the insertion process. Disposed in channel 28 is a sensor 30 which determines whether an orifice tube is properly located within the channel 28. Sensor 30 is a pressure responsive switch which generates a signal to indicate the presence of the orifice tube.

When the orifice tube is seated within channel 28, a holding member 32 is activated. The holding member 32 engages the orifice tube to prevent the tool 10 from slipping or moving during the insertion process. After being secured to the orifice tube, the tool 10 is activated as will be described in greater detail below. The tool 10 includes means for determining whether a check valve 19 has been inserted into the orifice tube. In the preferred embodiment, this means comprises a press pin 34. The press pin 34 is a pneumatically activated cylinder having a pressure responsive switch 36 connected thereto. The press pin 34 reciprocates within the housing 24 of the tool 10 and enters the orifice tube. The press pin 34 will contact a check valve 19 if one is present within the orifice tube and this contact will be registered by the pressure responsive switch to indicate the presence of the valve. If no check valve is present, the tool will generate an audio or visual signal to the work station operator and the insertion cycle will be terminated. Alternatively, the absence of a check valve can be determined by an optical sensor disposed on the housing of the tool 10. The optical sensor measures the amount of light reflectivity in the orifice tube to determine whether a check valve is present.

The press pin 34 contacts the orifice tube check valve 19 and pushes it a predetermined distance to its proper seating depth within the orifice tube. The tool 10 includes a limit switch 36 which limits the distance the press pin 34 can move the check valve. This ensures that the check valve 19 is properly seated within the orifice tube.

Once the check valve 19 is properly seated, the tool 10 marks the exterior surface of the orifice tube to indicate visually that a check valve has been properly inserted. The tool 10 includes marker 38 which reciprocates from a first position not in contact with the tube to a second position in contact with the orifice tube. The marker 38 marks the surface with a brightly colored mark which can be seen easily by the work station operator, as well as by any other subsequent operator down-line from this station. If no orifice tube check valve is placed in the orifice tube, the tool 10 will generate an audio or visual signal to the operator. This signal can be seen on the work station 20 or heard by the operator.

In operation, as the evaporator assembly is being fabricated, an operator manually inserts an orifice tube check valve 19 into the orifice tube. The operator then places the tool 10 over the orifice tube such that the orifice tube is within the channel 28. The holding member 32 clamps the tool 10 tightly to the orifice tube and the press pin 34 reciprocates into the orifice tube to first determine whether a check valve is present, and second, to properly seat the valve if it present. After being seated, the tool marker 38 stamps the exterior surface of the tube and the holding member 32 releases the orifice tube.

In an alternative embodiment, the tool 10 could include a magazine-type feeder for automatically feeding the check valve into the orifice tube, thus eliminating the need for manual insertion. The magazine feeder would include a plurality of check valves which would drop into a feeding slot after the tool 10 has been clamped by holding member 32 to the orifice tube. The press pin 34 would insert the check valve into the tube to its proper depth.

Many other variations and modifications of the present invention will no doubt occur to those skilled in the art. It is the following claims, including all equivalents, which define the scope of the invention.

What is claimed is:

1. An evaporator orifice tube check valve inserting tool, comprising:

a housing including means for receiving an evaporator orifice tube, said means comprising an evaporator orifice tube receiving channel;

an evaporator orifice tube detecting sensor for determining when the evaporator orifice tube is received in the evaporator orifice tube receiving channel;

a holding member disposed on said housing for releasably engaging the evaporator orifice tube when the evaporator orifice tube is seated in said evaporator orifice tube channel;

an evaporator orifice tube check valve press pin for inserting said evaporator orifice tube check valve into said evaporator orifice tube to a predetermined location, said press pin comprising a pneumatically activated cylinder operative to engage said evaporator orifice tube check valve and insert the evaporator orifice tube check valve into the evaporator orifice tube a predetermined distance;

evaporator orifice tube check valve location means for determining the location of the evaporator orifice tube check valve within the evaporator orifice tube, said means comprising a pressure responsive switch for measuring the amount of pressure applied against said press pin;

a limit switch disposed on said housing for limiting the travel of said pneumatically activated cylinder into said evaporator orifice tube;

an evaporator orifice tube marker disposed in said evaporator orifice tube channel of said housing for marking the evaporator orifice tube only if the evaporator orifice tube check valve is at said predetermined location; and an evaporator orifice tube check valve signal generating device for signaling an operator when an evaporator orifice tube check valve is improperly located within said evaporator orifice tube.

* * * * *